T. BROWN.
MOWER.
APPLICATION FILED OCT. 10, 1914. RENEWED MAY 17, 1918.
1,270,489.
Patented June 25, 1918.
2 SHEETS—SHEET 1.
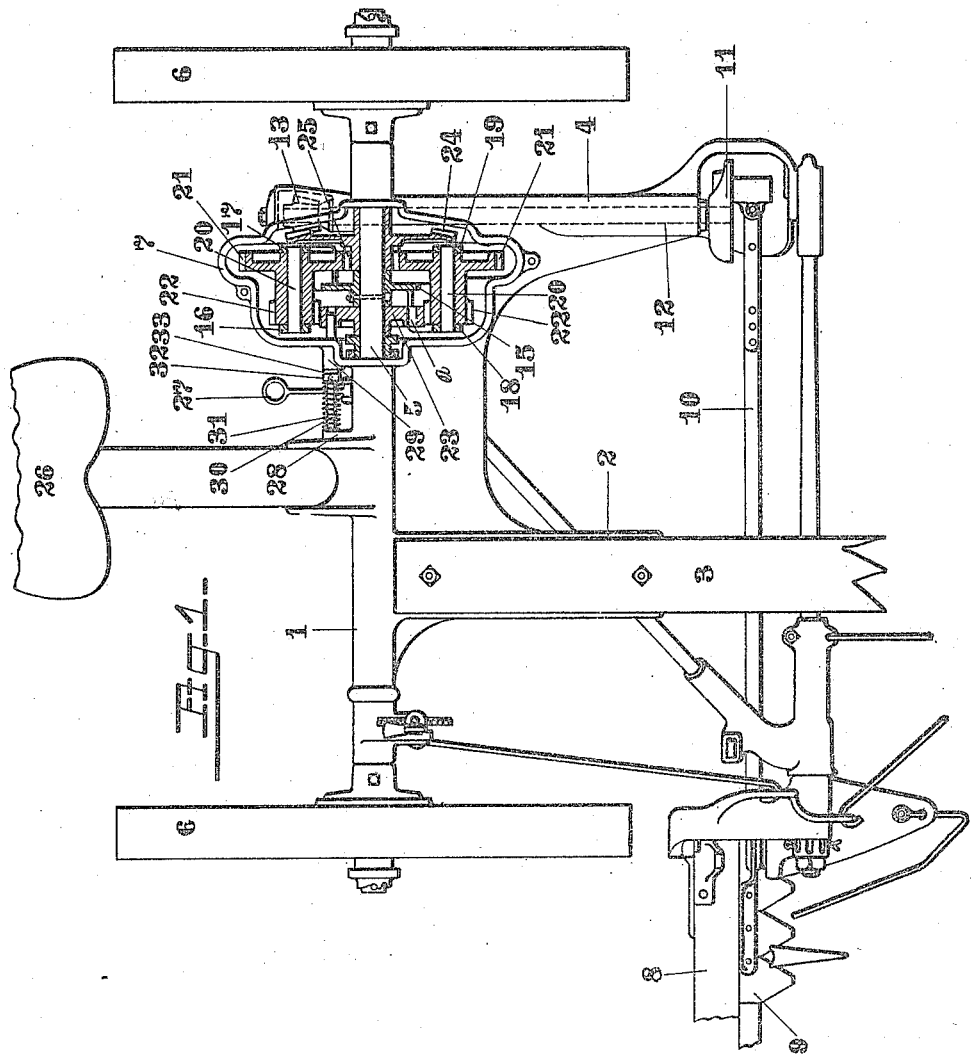

T. BROWN.
MOWER.
APPLICATION FILED OCT. 10, 1914. RENEWED MAY 17, 1918.
1,270,489.
Patented June 25, 1918.
2 SHEETS—SHEET 2.
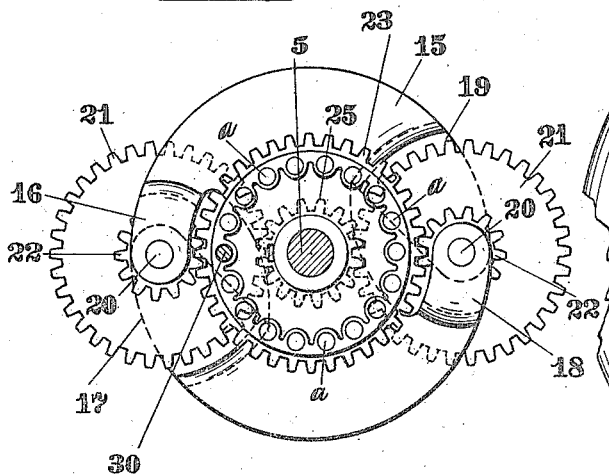
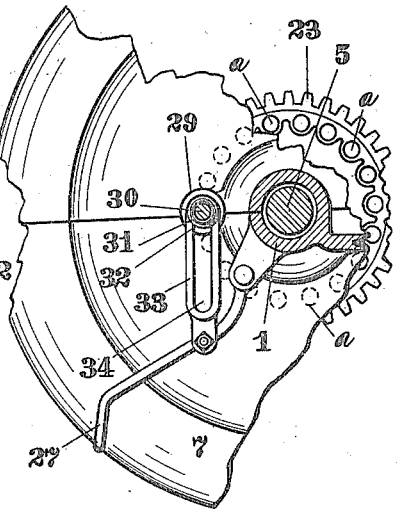
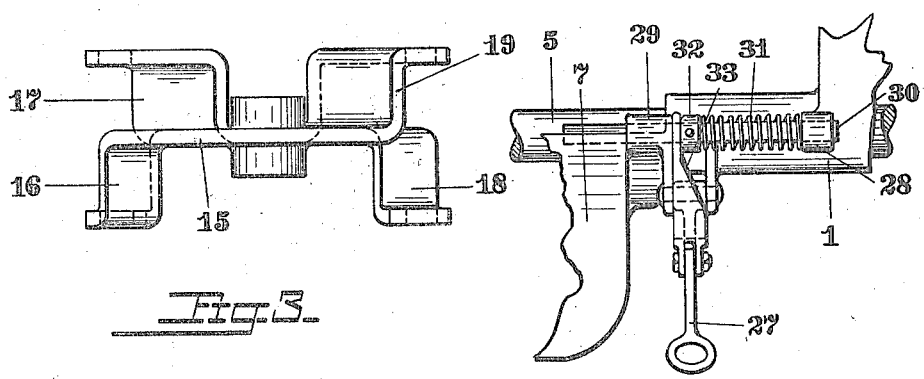

though the pitman from the crank shaft 12.

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

MOWER.

1,270,489.      Specification of Letters Patent.      Patented June 25, 1918.

Application filed October 10, 1914, Serial No. 866,109. Renewed May 17, 1918. Serial No. 235,055.

*To all whom it may concern:*

Be it known that I, THEOPHILUS BROWN, a citizen of the United States, residing at Moline, in the county of Rock Island and State of Illinois, have invented certain new and useful Improvements in Mowers, of which the following is a specification, reference being had therein to the accompanying drawing.

My invention relates to mowing machines and more particularly to the means employed for driving the cutting mechanism, having in view the conservation of power, lightness of draft and effectiveness of operation.

Referring to the drawings in which similar numerals indicate identical parts—

Figure 1 is a plan view of a mower with the top of the gear case removed and the gearing shown in section.

Fig. 2 is an enlarged detail view showing the mounting of a portion of the gearing.

Fig. 3 is an enlarged plan view of the member shown in elevation in Fig. 2 and upon which a portion of the gearing is mounted.

Fig. 4 is an enlarged detail view and end elevation of the mechanism employed to throw the gearing out of action, and Fig. 5 is a plan view in part of Fig. 4.

My invention is applicable more particularly to the type of mower gearing shown and described in my pending application filed December 11, 1913, Serial No. 806094, to which reference is made.

The frame of the mower comprises a rear tubular portion 1, a forwardly projecting portion 2 to which a draft pole 3 is attached, and a tubular portion 4 extending forwardly at right angles to the tubular portion 1. An axle 5 is journaled in the portion 1 and carries supporting wheels 6 secured thereon with the usual type of pawl and ratchet so that the axle will revolve with the forward motion of the wheels only. A gear case 7 is preferably integral with the mower frame. A cutter bar 8 shown in part, and of the ordinary type, is supplied with a knife bar 9 adapted to be actuated by a pitman 10 connected thereto and to a crank 11, the latter being secured upon the forward end of a crank shaft 12 journaled in the tubular portion 4 of the frame; a bevel pinion 13 is secured rigidly to the rear end of the crank shaft 12.

Bolted or otherwise secured on the axle 5 is a member 15, preferably circular and having extended from opposite faces thereof brackets 16, 17, 18 and 19; the brackets 16 and 17 and the brackets 18 and 19 are diametrically opposite and are perforated to form bearings in which are mounted stub shafts 20, on each of which is a driving gear 21; each of the driving gears 21 has a pinion 22 revoluble therewith and in constant mesh with a gear 23 loosely mounted on the axle 5. A bevel gear 24 is loosely mounted on the axle 5 and meshes with the bevel pinion 13 on the crank shaft 12; preferably integral with the hub of the bevel gear 24 is a pinion 25 meshing with the gears 21.

Within convenient reach from the driver's seat 26 is a lever 27 pivotally supported on the mower frame. Slidably mounted in a bearing 28 on the mower frame and a bearing 29 formed by an opening in a side of the gear case 7 is a bolt or stop 30 adapted to engage with any one of a series of circularly arranged equidistant perforations *a* in the gear 23, and normally retained in such engagement by a coil spring 31 which exerts its pressure between the bearing 28 and a collar 32 rigidly secured to the bolt 30. A sliding cam faced member 33 is connected to the lever 27 and extends upwardly, having an elongated slot 34 through the upper end of which the bolt 30 passes; the member 33 acts between the collar 32 and the bearing 29 so that if the lever 27 is lifted the cam member 33 connected thereto will be raised, the cam face thereof operating against the collar 32 and withdrawing the bolt or stop 30 from engagement with a perforation in the gear 23.

As shown in Fig. 1 the gearing is in proper engagement to transmit power from the wheels 6 to the cutting mechanism upon starting the machine; the member 15 rigidly secured to the axle 5, between the gear 23 and the bevel gear 24 revolves therewith carrying the driving gears 21, and as the gear 23 is free upon the axle 5 and held against movement by the bolt or stop 30, the driving gears 21 will be revolved through the pinions 22 meshing with the gear 23; the driving gears 21 actuate the bevel gear 24 through the pinion 25 on the hub thereof and with which they are in constant mesh, and as the bevel gear 24 is in mesh with the bevel pinion 13 the cutting mechanism is actuated by the revolution of the crank shaft 12 upon which the bevel pinion is secured.

To prevent operation of the cutting mechanism when before its use is necessary, or to stop it while in operation, I raise the lever 27 and consequently the cam member 33 the latter operating between the face of the bearing 29 and the collar 32 rigidly secured on the bolt 30 causes the latter to be withdrawn from engagement with one of the perforations $a$ in the gear 23; the gear 23 is now free to revolve on the axle 5, and while the member 15 revolves with the axle 5 the driving gears 21 travel idly about the gear 23 and the pinion 25 conveying no power through the latter to actuate the cutting mechanism; it is obvious that by lowering the lever 27 and the cam member 33 the bolt 30 under pressure of the coil spring 31 will again engage with the nearest perforation in the gear 23 and hold the latter securely against movement so that the power of the driving gears 21, carried by the member 15 which is rigidly attached to the axle 5 between the gear 23 and the bevel gear 24, will be employed upon the pinion 25 to drive the bevel gear 24 and through enmeshment of the latter with the bevel pinion 13 on the crank shaft 12 the cutting mechanism will be operated.

By mounting the member 15 between the gear 23 and the bevel gear 24 the strain of the work of the driving gears 21 and pinions 22, carried by the member 15, is more evenly distributed, adding to the durability and efficiency of the parts.

What I claim is—

1. In a mower, the combination of an axle, ground wheels supported on the axle and adapted to rotate therewith in a forward direction a reciprocating cutter, a train of power transmitting devices in constant engagement with each other and with the cutter and adapted to operate the latter by power from the ground wheels when one of said devices is held immovable, said train comprising a bevel gear loosely mounted on the axle and permanently connected with the cutter, a second gear loosely mounted on the axle, a member permanently secured on the axle and rotatable therewith, gearing supported on said member and in constant engagement with the bevel gear and second gear, and means to hold the second gear immovable during operation of the cutter.

2. In a mower, the combination of an axle, ground wheels supported on the axle and adapted to rotate therewith in a forward direction, a reciprocating cutter, a train of power transmitting devices in constant engagement with each other and with the cutter and adapted to operate the latter by power from the ground wheels when one of said devices is held immovable, said train comprising a bevel gear loosely mounted on the axle and permanently connected with the cutter, a second gear loosely mounted on the axle, a member rotatable with the axle and rigidly secured thereon between the bevel gear and the second gear, gearing supported on said member and in constant engagement with the bevel gear and second gear, and means to hold the second gear immovable during operation of the cutter.

3. In a mower, the combination of an axle, ground wheels supported on the axle and adapted to rotate therewith in a forward direction, a reciprocating cutter, a train of power transmitting devices in constant engagement with each other and with the cutter and adapted to operate the latter by power from the ground wheels when one of said devices is held immovable, said train comprising a bevel gear loosely mounted on the axle and permanently connected with the cutter, a second gear loosely mounted on the axle, a member rotatable with the axle and rigidly secured thereon between the bevel gear and the second gear, gearing supported on said member and in constant engagement with the bevel gear and second gear, means to hold the second gear immovable during operation of the cutter, said holding means being movable to release the second gear and check the operation of the cutter.

4. In a mower, the combination of an axle, ground wheels supported on the axle and adapted to rotate therewith in a forward direction, a reciprocating cutter, a train of power transmitting devices in constant engagement with each other and with the cutter and adapted to operate the latter by power from the ground wheels when one of said devices is held immovable, said train comprising a bevel gear loosely mounted on the axle and permanently connected with the cutter, a second gear loosely mounted on the axle and having a series of circularly arranged openings, a member rotatable with the axle and rigidly secured thereon between the bevel gear and the second gear, gearing supported on said member and in constant engagement with the bevel gear and second gear, and a stop operable at will to engage with any one of said openings to hold the second gear immovable during operation of the cutter, said stop being movable to release the second gear and check the operation of the cutter.

In testimony whereof I affix my signature, in presence of two witnesses.

THEOPHILUS BROWN.

Witnesses:
W. B. McKAHIN,
LLOYD HUMBERSTONE.

Copies of this patent may be obtained for five cents each, by addressing the "Commissioner of Patents, Washington, D. C."